United States Patent [19]
Spanke

[11] Patent Number: 5,115,426
[45] Date of Patent: May 19, 1992

[54] BROADBAND ISDN PACKET SWITCHING ARRANGEMENTS

[75] Inventor: Ronald A. Spanke, Wheaton, Ill.

[73] Assignee: AT&T Bell Laboratories, Murray Hill, N.J.

[21] Appl. No.: 502,592

[22] Filed: Mar. 30, 1990

[51] Int. Cl.⁵ .............................................. H04J 3/26
[52] U.S. Cl. .................... 370/60; 370/58.1; 370/110.1
[58] Field of Search ............. 370/58.1, 60, 60.1, 370/94.1, 110.1

[56] References Cited

U.S. PATENT DOCUMENTS

| | | | |
|---|---|---|---|
| 3,573,377 | 4/1971 | Anderson et al. | 179/2 |
| 3,612,767 | 10/1971 | Anderson et al. | 179/2 |
| 4,592,048 | 5/1986 | Beckner et al. | 370/60 |
| 4,700,341 | 10/1987 | Huang | 370/80 |
| 4,763,317 | 8/1988 | Lehman et al. | 370/58 |

Primary Examiner—Benedict V. Safourek
Assistant Examiner—Melvin Marcelo
Attorney, Agent, or Firm—Ross T. Watland; Kenneth H. Samples

[57] ABSTRACT

A broadband packet switch arrangement comprising a broadband packet unit connected to a plurality of customer lines and a video switch for selectively connecting packetized video signals from a plurality of video sources to the customer lines. The broadband packet switch unit selectively connects customer lines and transmits received control packets received from the customer lines to a control unit which responds to video request packets by controlling the video switch to connect selected video packets to the customers lines. Each customer line includes a selector circuit which receives video packets and inter-customer broadband ISDN packets and merges them onto the customer line. After the control unit has granted permission to connect a video source to a customer line, video source change requests for the line are sent directly to the video switch which responds thereto by connecting a requested video source to the customer line.

17 Claims, 8 Drawing Sheets

BROADBAND VIDEO SWITCHING MODULE 6000

BROADBAND SWITCHING MODULE 6000

BROADBAND SWITCH UNIT 6001

TRANSLATION
TABLE
63
(FOR 6003)

| VCI IN | PRH | VCI OUT |
|---|---|---|
| 1 | 6005 | 16 |
| 18 | 6004 | 64 |
| 200 | 6007 | 203 |
| . | . | . |
| . | . | . |

FIG. 6

TRANSLATION
TABLE
63
(FOR 6004)

| VCI IN | PRH | VCI OUT |
|---|---|---|
| 1 | 6005 | 17 |
| 64 | 6003 | 18 |
| 80 | 6005 | 65 |
| 200 | 6007 | 204 |
| . | . | . |

FIG. 7

TRANSLATION
TABLE
63
(FOR 6005)

| VCI IN | PRH | VCI OUT |
|---|---|---|
| 16 | 6003 | 1 |
| 17 | 6004 | 1 |
| 65 | 6004 | 80 |
| . | . | . |
| . | . | . |

FIG. 8

INTERFACE 6100

BROADBAND VIDEO SWITCHING MODULE 6000

BROADBAND VIDEO SWITCH UNIT 6001

BUFFER 64'

BROADBAND ISDN PACKET SWITCHING ARRANGEMENTS

CROSS-REFERENCE TO RELATED APPLICATION

This application is related to the following application: J. M. Johnson, "Arrangements for Switching Multiple Packet Types Combined in a Single Packet Stream", Ser. No. 07/502,352, filed Mar. 30, 1990.

The related application is filed concurrently herewith and is assigned to the assignee of the present invention.

TECHNICAL FIELD

This invention relates to packet switching systems for switching both video packets and non-video packets to packet service customers over customer access lines.

BACKGROUND OF THE INVENTION

The extensive use of personal computers and other data processing facilities at home and in the office gave rise to a need for voice and data transmission and switching capabilities on a wide spread basis. To satisfy this need, the integrated services digital network (ISDN) providing approximately 144 kilobits per second bandwidth was developed for use by telecommunications subscribers. The continuing growth of digital services and capabilities has now created a need for packet transmission and switching arrangements which have the capacity for larger bandwidths. In response to this need for higher information bandwidths, a new capability known as broadband ISDN (B-ISDN) is being developed to provide bandwidths on the order of 150 megabits per second.

The prospect of a 150 megabit per second channel to multitudes of residential and business customers has caused system planners to seek new revenue generating services which can use the bandwidth. One such desirable service is the delivery of full motion video, e.g. television, to B-ISDN customers. Packetized television signal delivery requires a bandwidth of approximately 45 megabits per second which is well within the B-ISDN capacity, however television signals are not bursty like computer data but are substantially continuous. Relatively few video channels can be presented continuously to customers over a single 150 megabit per second B-ISDN connection.

Video service can be provided to B-ISDN customers by selectively connecting one of many video sources to a single video channel conveyed to those customers. In this way a single 45 megabit per second video channel on a B-ISDN link can deliver many different television programs to a customer, one at a time. An arrangement is needed however, to provide the necessary selective connections between the video sources and B-ISDN video channels on customer access lines.

In one packet switching arrangement, as described in the co-pending application Johnson-Spanke, customer access lines are connected to a broadband packet network which provides selective packet connections among B-ISDN customers connected to the access lines. The arrangement described in the Johnson et al., application can be extended to provide selected video connections by attaching video sources as inputs to the same broadband packet network which provides broadband packet connections among the B-ISDN customers. Although the use of the broadband packet network provides the ability to selectively connect packets from the video sources to customer access lines, it is very inefficient.

Packet switching networks are designed, and their efficiency maximized for the selective connection of bursty data. Efficiency is achieved by sharing network capacity among users when some users have information to send and others do not. In the case of relatively continuous high bandwidth data such as video signals network bandwidth is continuously used and is not available for sharing. Accordingly, a significant number of video channels through a broadband packet network can use up the network's capacity to transmit other information. The use of a packet network to switch both video and non-video packets results in blocking by the packet network of non-video packets, due to network capacity limits or in the use of a packet switching network with far greater capacity (and greater expense) than would be needed to efficiently deliver the non-video packets among the customers.

A need exists for a packet switching arrangement which can efficiently connect packets among customers connected to a plurality of customer access lines while at the same time selectively delivering broadband video packets to the customers via the same customer lines.

SUMMARY OF THE INVENTION

This need is meet and a technical advance is achieved in accordance with the present invention in which a packet switching network, connected to a plurality of customers by incoming and outgoing lines, is used to provide selective packet connections among those customers and a video switch is used to selectively connect video signal packets from video sources to the customers via the outgoing lines. The coordinated use of separate video switches and packet networks permits maximizing the efficiency of each to the type of traffic it conveys, thereby improving the efficiency and reducing cost of the overall arrangement.

The same customer outgoing lines in the present invention convey both video packets from the video switch and customer packets from the packet switching network. To avoid assigning too much traffic to a given customer line, a single control unit which grants and denies permission to communicate in response to service requests from customers, controls both the video switch and the packet network. Requests for service from customers are received by the packet network and selectively connected thereby to the control unit.

Each of the outgoing lines of the arrangement includes a selector circuit which receives both customer packets from the packet network and video packets from the video switch and selectively merges them onto the same outgoing line to a customer. Advantageously, the selector gives priority to video packets and transmits video packets on the associated outgoing lines whenever they are present. In this way, the relatively continuous nature of video signals can be maintained.

The service of providing full motion video to customers will be most popular, when customers can use the switched service the same way they use television today. An almost instantaneous ability to change channels is one desirable feature of today's television. Rapid channel change is difficult to achieve in an arrangement where the channel change (video source selection) occurs at a telecommunication central office. At times, such as commercials, when many customers substantially simultaneously change channels, the single control unit and the connection to it within the central office can be overloaded resulting in significant channel change delays.

Advantageously, an embodiment is employed to avoid channel change delays. The embodiment includes a bandwidth allocation controller which records the bandwidth available to the customers and responds to initial set-up video request signals received from one of the customers by granting permission to connect a video channel to that customer. After permission is granted, channel changes are controlled by video source identity packets from the one customer which are sent to a video switch without any involvement by the bandwidth allocation controller. A video switch controller of the video switch responds to the video source identity packets by rapidly connecting the source identified in the packet to the customer via the video switch. This embodiment uses the bandwidth allocation controller to allocate video bandwidth on the customer line and that bandwidth is thereafter used as directed by the customer in video source identity packets. Since the bandwidth required by one video channel is the same as is required by any other video channel, the customer can continue to rapidly change channels without being delayed by consulting the bandwidth allocation controller.

A specific illustrative embodiment discloses a packet switching arrangement including a broadband packet switch connected to a plurality of customer access lines for selectively connecting customer packets between those lines and a video switch for selectively connecting video signal packets from a plurality of video sources to the customer access lines. The broadband packet switch connects video service request packets received on one of the customer access lines to a bandwidth allocation controller which responds thereto by granting permission to the video switch for the connection of video signal packets to the one customer access line. Additionally, the broadband switch responds to video source request packets received on the one customer access line and identifying one of the video sources by connecting the video source request packet to the video switch. The last named switch responds to the video source request packet and the previously generated permission from the bandwidth allocation controller by connecting video packets from the identified video source to the one customer access line.

BRIEF DESCRIPTION OF THE DRAWING

FIGS. 6 through 8 represent translation tables of information stored in the communication path circuits of FIG. 4;

DETAILED DESCRIPTION

Figure 1:
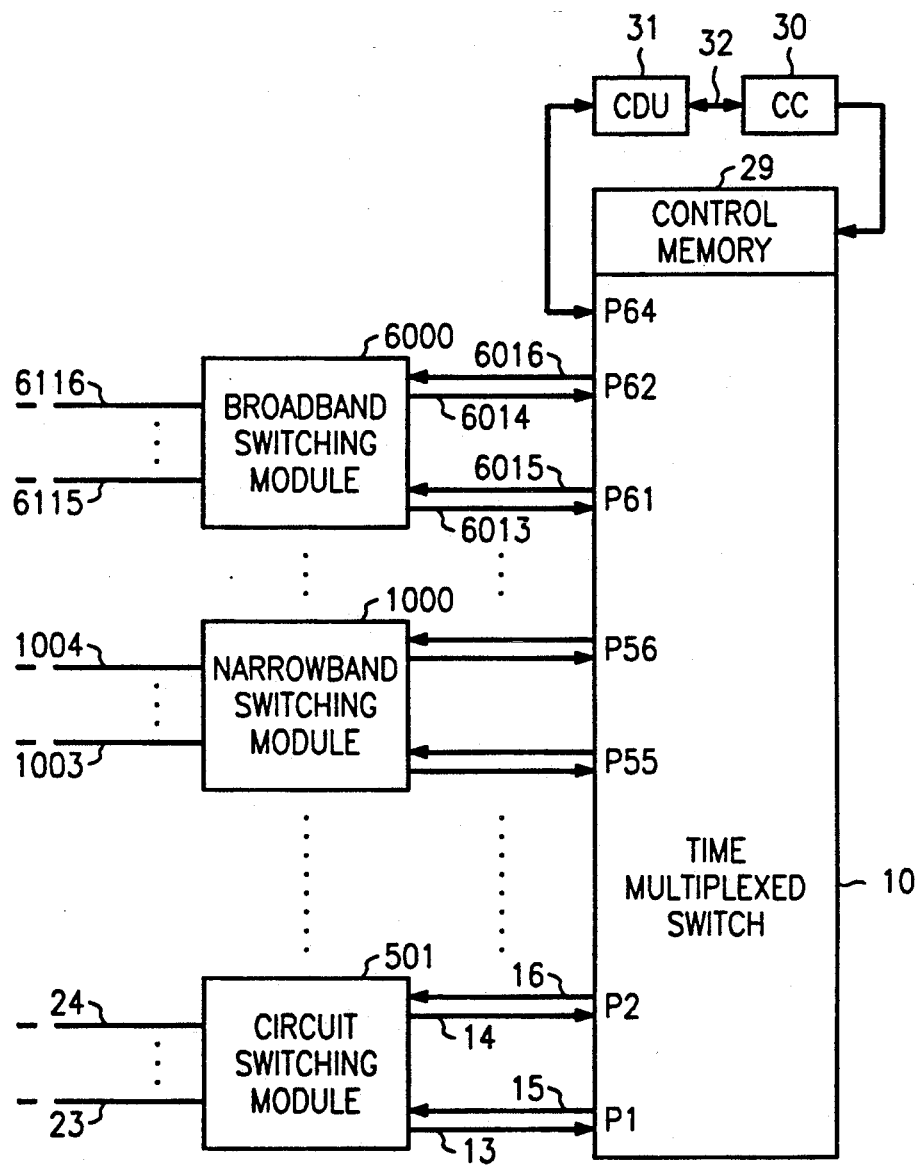
FIG. 1 is a block diagram of a switching system incorporating the present invention.

FIG. 1 is a block diagram of a telecommunication system illustrating the principles of the present invention. The illustrated system includes a plurality of switching modules 501, 1000 and 6000 which are each connected to two input/output ports P1 through P62 of a time-multiplex switch 10 via a pair of bi-directional time-multiplex lines comprising, for example, time-multiplex lines 13 through 16. Time-multiplex switch 10 completes time-shared space division paths among the switching modules 501, 1000 and 6000 under control of information stored in a control memory 29 to enable communication among the switching modules. Control information necessary to coordinate the operation of the switching modules and the time-multiplex switch 10 is exchanged between the switching modules and between the switching modules and a central control 30 via time-multiplex switch 10 and a control distribution unit 31.

Each of the switching modules is connected to a plurality of customer lines and trunks, e.g., 23 and 24 and either interconnects the lines and trunks connected thereto or cooperates with the central control 30 and other switching modules to complete connections between customers of different switching modules via the time-multiplex switch 10. Switching module 501 is a circuit switching module and is connected to, for example, analog telephone customers via lines 23 and 24. Circuit switch module 501 performs analog to digital and digital to analog conversion, time slot interchange for digitized customer signals and cooperates with central control 30 and the other switching modules for the connection of its customers.

Narrowband ISDN switching module 1000 is connected to a plurality of ISDN customers via narrowband ISDN lines 1003 and 1004 and provides connections between the ISDN customers and other customers of the system of FIG. 1. Narrowband switching module 1000 separates the B- and D-ISDN channels, provides packet switching connections for the D channels and circuit switch connections for the B channels using a time slot interchanger (not shown). A system of the type shown in FIG. 1 comprising narrowband ISDN switching modules and circuit switching modules is shown and described in detail in Beckner et al., U.S. Pat. No. 4,592,048 and is described herein only in so far as necessary to describe the operation of broadband switching module 6000 and its cooperation with the other units of FIG. 1.

Figure 2:
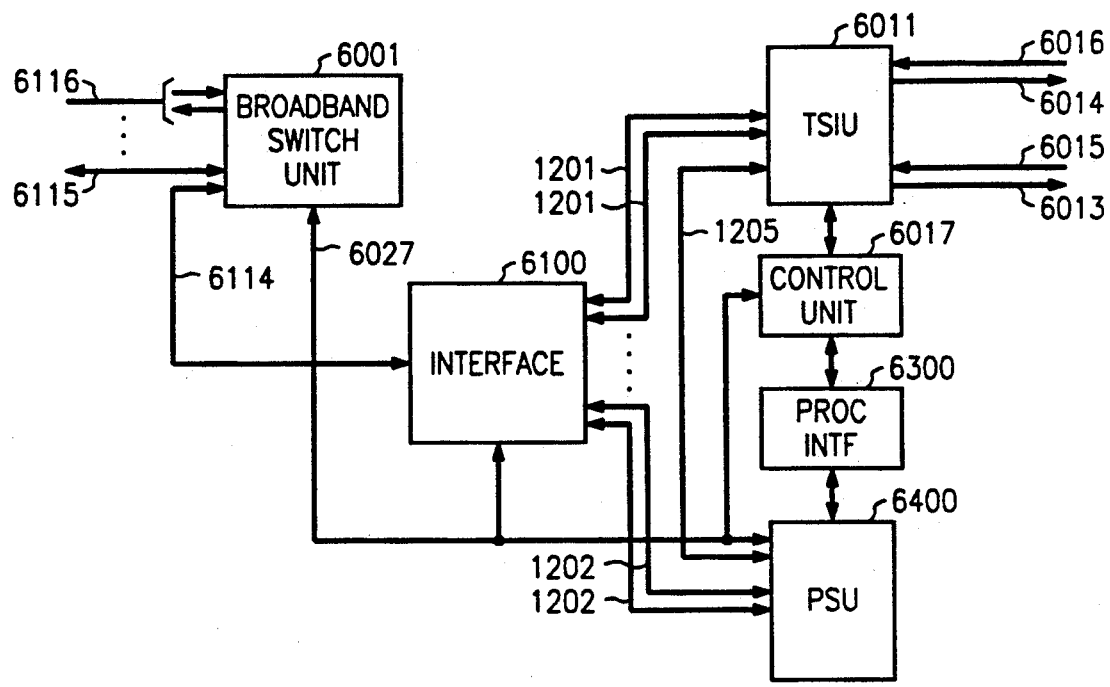
FIG. 2 is a block diagram of broadband switching module shown in FIG. 1.
Figure 3:
FIG. 3 is a representation of broadband ISDN packet.

Broadband switching module 6000, shown in greater detail in FIG. 2, comprises a broadband switch unit 6001 which is connected to a plurality of B-ISDN customers over a plurality of bi-directional B-ISDN optical fibers 6115 and 6116. Optical fibers 6115 and 6116 convey packets of digital information at the rate of 150 megabits per second where each packet (FIG. 3) comprises 48 bytes of customer information and 5 bytes of header information. The header information includes certain packet overhead information such as error checks and the virtual channel identifier (VCI) of the packet. The VCI of a packet uniquely identifies, on a given communication path, the communication of which the packet is a part.

Although all packets on communication paths 6115 and 6116 are in the B-ISDN format, they may be parts of different communications and may be to or from non-B-ISDN customers. For example, a B-ISDN packet virtual channel may be a high bandwidth, e.g., 20 megabits per second channel between two B-ISDN users, it may be a low bandwidth, e.g., 64 kilobits per second channel between B-ISDN users or it may be a 64 kilobits per second channel between a B-ISDN user and a narrowband ISDN telephone set on narrowband switch module 1000. Broadband switch module 6000 responds to the VCIs of the packets it receives to interconnect the users of the identified virtual channel.

Broadband switch unit 6001 of broadband switch module 6000 is connected to customer communication paths 6115 and 6116, as well as to a bi-directional communication path 6114 connected to an interface 6100. Broadband switch unit 6001 responds to the VCI of each packet received on a communication path by connecting the received packet to a predetermined one or more of the outgoing optical fiber communication paths 6114 through 6116. The predetermined output for most VCIs is selectively changed from time-to-time by a control arrangement which is discussed in more detail later herein. When the outgoing communication path is connected to a customer fiber, e.g., 6115 the packet is sent to the customer connected to that fiber in the same form that it was received, i.e., FIG. 3. The predetermined output for packets having certain VCIs is communication path 6114 which is connected to the interface unit 6100. Fiber 6114 and the interface unit 6100 receive all B-ISDN packets containing system control information and all B-ISDN packets which are to be connected to non-B-ISDN customers such as customers connected to narrowband switching module 1000 or circuit switch module 501.

Interface unit 6100, which is described later herein, receives packets on communication line 6114 and places them in buffer storage for transmission in selected time slots on selected ones of a plurality of bi-directional time-multiplex lines 1201 and 1202. Transmission on time-multiplex lines 1201 and 1202 takes place at the rate of 64 kilobits per second. The particular time slot and time-multiplex line for a packet received from communication path 6114 is selected by interface unit 6100 in response to the VCI of the received packet. Lines 1201 are connected to a time slot interchange unit 6011 and lines 1202 are connected to a packet switch unit 6400. Interface unit 6100 also receives information from the time slots on time-multiplex lines 1201 and 1202, and buffers the information until an entire B-ISDN packet is received. Upon receipt of an entire packet from a given time-multiplex line, time slot interface unit 6100 affixes a preselected VCI to the packet and transmits the packet to broadband switch unit 6001 via communication path 6114.

Time slot interchange unit 6011 receives time slots of information on time-multiplex lines 1201 and selectively connects those time slots to the time slots of time-multiplex lines 6013 and 6014 for connection to the time-multiplex switch 10. Time-multiplex switch 10 connects the time slots to other switching modules, e.g., 1000 and 501. Similarly, information from other switching modules is selectively connected from time-multiplex switch 10 to time slot interchange unit 6011 in the time slots of time-multiplex lines 6015 and 6016.

Packet switch unit 6400 accumulates the packets from interface unit 6100 and provides narrowband packet switching among the time-multiplex lines 1202. Information returning to the interface unit 6100 from packet switch unit 6400 is accumulated into B-ISDN packets, provided with a preselected VCI and transmitted to broadband packet switch unit 6001 via communication path 6114.

Broadband switching module 6000 includes a control unit 6017 which operates in conjunction with central control 30 and the control units (not shown) of other switching modules, e.g., 501 and 1000 to control the broadband switch unit 6001, the interface unit 6100, the time slot interchange unit 6011 and the packet switch unit 6400. In addition to control information received from central control 30 and the other switching modules, control information is received and transmitted by control unit 6017 from and to the customer communication paths, e.g., 6115 via the packet switch unit 6400, the interface unit 6100 and the broadband switch unit 6001. Control unit 6017 exercises control of the units within switching module 6000 over conductor 6027.

Certain of the available VCIs on the B-ISDN communication paths, e.g. 6115, are preassigned for specific purposes. For example VCI 1, which is referred to as a layer management channel, is used by B-ISDN customers to send and receive control information such as call set-up information to and from broadband switch module 6000. Broadband switch unit 6001 recognizes each packet with VCI 1 and connects that packet to interface unit 6100 via communication path 6114 using a virtual channel identity which is preassigned for the exchange of control information between the particular incoming communication path, e.g., 6115 and interface unit 6100.

Figure 4:
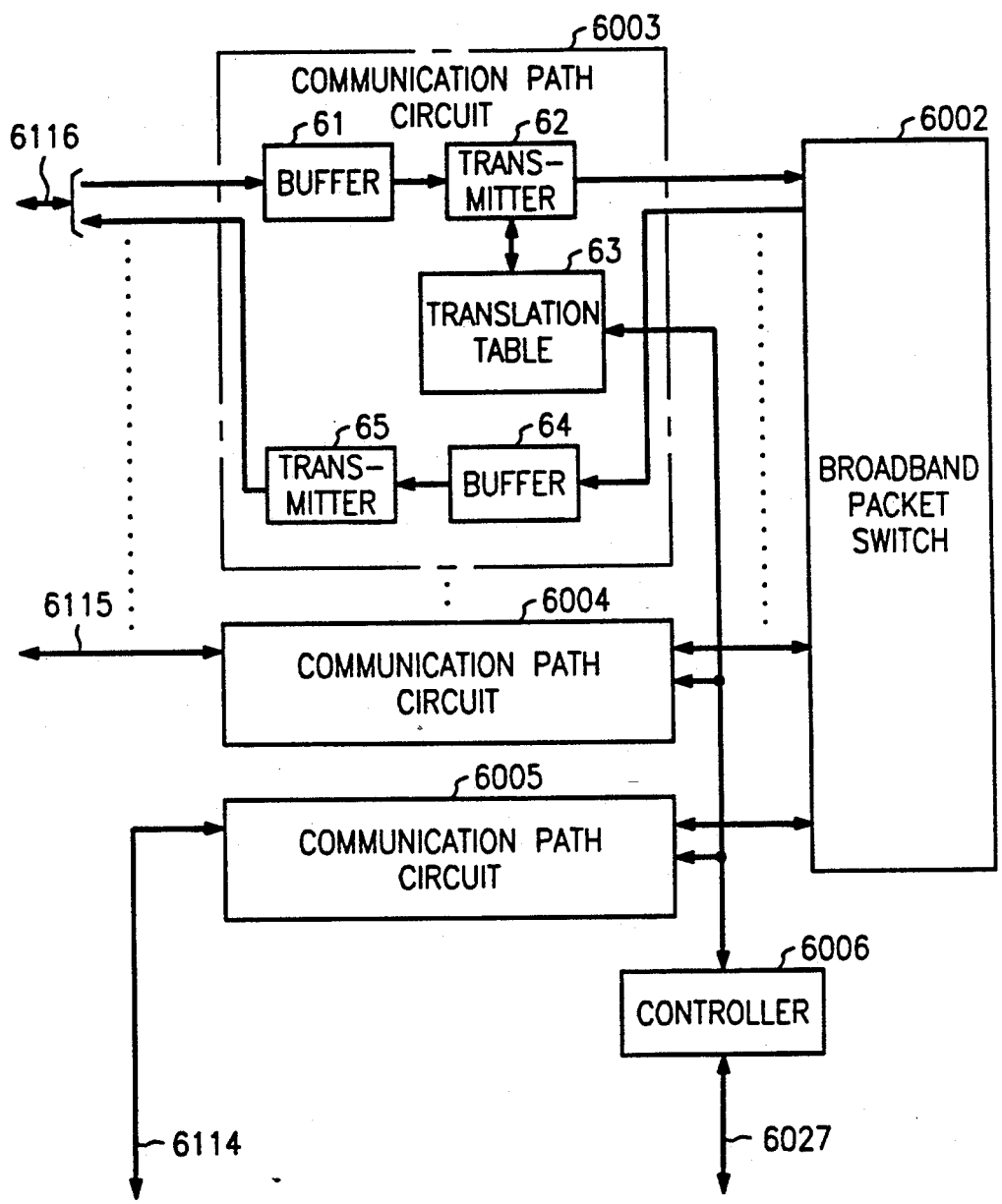
FIG. 4 is a block diagram of a broadband switch unit of FIG. 2.
Figure 5:
FIG. 5 is a representation of a broadband packet sent to the inputs of the broadband packet switch of FIG. 4.

FIG. 4 is a more detailed representation of broadband switch unit 6001 which comprises a broadband packet switch 6002, a controller 6006, a communication path circuit, 6003 and 6004 for each communication path 6115 and 6116, respectively, and a communication path circuit 6005 for communication path 6114. Communication path circuits 6004 and 6005 are substantially identical to communication path circuit 6003, which is shown in detail in FIG. 4. Each communication path circuit receives packets from a B-ISDN line, e.g., 6116 and buffers them in a buffer 61. A transmitter 62 reads a packet from buffer 61 and, responsive to the received VCI, reads a new VCI and physical routing header from translation table 63 in preparation for sending the packet to broadband packet switch 6002. The transmitter 62 replaces the incoming packet VCI with the new VCI, appends the physical routing header to the packet and transmits the packet and physical routing header to the broadband switch network 6002. A packet, as transmitted to broadband packet switch 6002, is shown in FIG. 5.

Broadband packet switch 6002 responds to the physical routing header of each packet it receives by transmitting that packet to a communication path circuit, e.g., 6004 identified by the physical routing header. The identified communication path circuit 6004 receives the packet and stores it in a buffer 64. A transmitter 65 reads packets from the buffer 64, removes the physical routing header and transmits the packet in B-ISDN format (FIG. 3) to the destination customer on communication path 6115. Communication path circuit 6005 responds similarly to transmit packets from broadband packet switch 6002 to the interface unit 6100 over the communication path 6114.

Translation table 63 of a communication path circuit, e.g., 6003 stores the physical routing header and the new VCI for each packet received on its connected communication path, e.g., 6116. For VCIs which identify communication among customers, the new VCI and physical routing header stored in translation table 63 are computed by control unit 6017 and transmitted to table 63 when a connection is set-up. Other VCIs on the communication paths, e.g. 6115, are permanently assigned to a switching function and the new VCI and physical routing headers associated therewith are stored in the translation table 63 when the system is initialized. For example, VCI 1 is assigned to be a control information channel on both communication paths 6115 and 6116. The physical routing header stored with regard to VCI 1 in translation tables 63 of communication path circuits 6003 and 6004 identifies the communication path circuit 6005 which is connected to the interface unit 6100 via communication path 6114. The new VCI stored in each translation table 63, is unique for each communication path 6115 and 6116 so that the interface unit 6100 can distinguish the source of the control information.

FIGS. 6, 7 and 8 are representations of translation table 63 of communication path circuits 6003, 6004 and 6005, respectively. Each line of the represented translation tables corresponds to a received VCI (VCI IN) from one of communication paths 6114, 6115 or 6116 and identifies the physical routing header (PRH) to be appended to the packet and the new VCI (VCI OUT) to be used to to replace the received VCI. The first line of FIG. 7 shows that when a B-ISDN packet is received in VCI 1 (the preassigned control channel) a physical routing header (PRH) defining communication path circuit 6005 is to be appended to the packet and the new VCI of 17 is to be used to replace the received VCI of 1 before the packet is transmitted to the broadband packet switch 6002. Similarly, as shown in FIG. 6, when a packet having VCI 1 is received from communication path 6116 by communication path circuit 6003, a physical routing header defining communication path circuit 6005 and a new VCI of 16 are appended to the packet before it is transmitted to broadband packet switch 6002. It can be seen from these two examples that although each of the represented packets is received in the control channel VCI 1 and sent to the same communication path circuit 6005 they are each given different VCIs (16 and 17) which are transmitted through communication path circuit 6005 to interface 6100. The distinctive VCIs of 16 and 17 are used to distinguish between information from communication path circuit 6003 and communication path 6004. The second lines of FIGS. 6 and 7 represent an ongoing communication between customers attached to communication paths 6115 and 6116. As shown in FIG. 6, packets received in VCI 18 at communication path circuit 6003 are sent to communication path circuit 6004 of communication path 6115 in VCI 64. The other direction of the communication is represented in FIG. 7, which shows that packets received from communication path 6115 in VCI 64 are sent to communication path circuit 6003 of communication path 6116 in VCI 18. The translation table represented in FIG. 8 shows the physical routing headers and new VCIs to be assigned to packets received on communication path 6114 in VCIs 16, 17 and 65.

Figure 9:
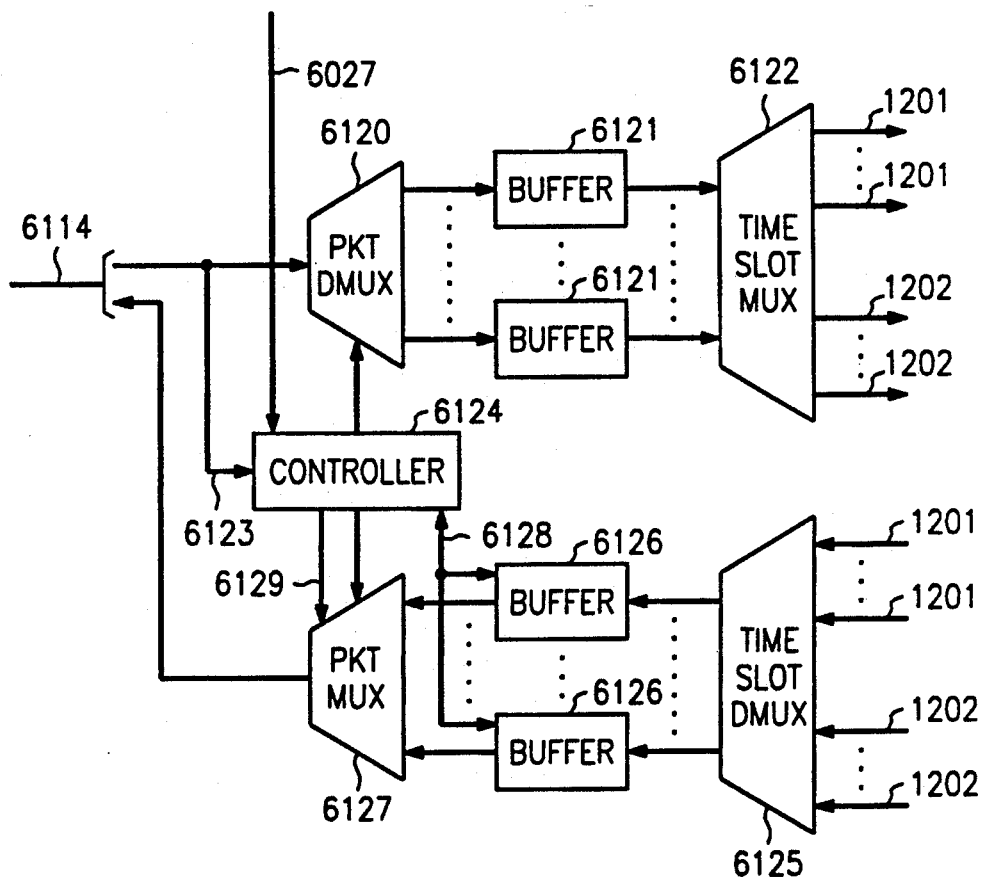
FIG. 9 is a block diagram of an interface unit of FIG. 2.

Interface unit 6100 is shown in greater detail in FIG. 9. All control packets and packets for non-B-ISDN customers are switched by broadband switch unit 6001 to interface unit 6100 via communication path 6114 in the format shown in FIG. 3. The header portion of each packet received by interface 6100 is applied via path 6123 to controller 6124 which interprets the VCI of the packet in accordance with path completion information stored in controller 6124. This stored information specifies the one of a plurality of buffer registers 6121, which is to receive each incoming packet. Responsive to the VCI of an incoming packet, controller 6124 controls the packet demultiplexer 6120 to gate the customer information portion of the packet to the buffer register 6121 specified by the path completion information in controller 6124. Each buffer register is uniquely associated, by the operation of a multiplexor 6122, with a predetermined time slot on a predetermined time-multiplex line, e.g. 1201 and 1202. Time slot multiplexer 6122 gates 1 byte from each buffer 6121 to the predetermined time slots at the rate of 1 byte per buffer per 125 microseconds (64 kilobits per second) as described in detail in the above-mentioned Beckner et al., patent.

Interface 6100 also includes a time slot demultiplexer 6125, which is connected to receive information from time-multiplex lines 1201 and 1202. In a reverse operation of time slot multiplexer 6122, each time slot received by interface 6100 on time-multiplex lines 1201 and 1202 is uniquely associated with one of a plurality of buffers 6126 by the operation of time slot demultiplexer 6125. When a buffer 6126 accumulates an entire packet (48 bytes) it sends a signal via a connection 6128 to controller 6124, which responds thereto by reading the packet from the signaling buffer 6126 and connecting the packet to outgoing communication path 6114 via packet multiplexer 6127. Also in response to the signal from a buffer 6126 on path 6128, controller 6124 generates a 5 byte packet header containing the VCI associated with the signaling buffer and thus associated with the time slot which provides data to that buffer. The generated header is transmitted to packet multiplexer 6127 where it is appended to the packet from buffer 6126 for transmission on communication path 6114.

As previously discussed, control information received by interface unit 6100 in VCIs 16 and 17 of communication path 6114 is connected by the operation of interface unit 6100 to packet switch unit 6400 (FIG. 2) via a predetermined time-multiplex line 1202 and a predetermined time slot. Packet switch unit 6400 in turn connects the control information to control unit 6017 via a processor interface 6300. In addition to the well-known capability for controlling time slot interchange unit 6011, packet switch unit 6400 and for cooperating with other switching modules, control unit 6017 controls the operation of the broadband switch unit 6002 and the interface unit 6100 to provide connections between B-ISDN customers connected to communication paths 6115 and 6116 and between B-ISDN customers connected to communication paths, e.g. 6115 and non-B-ISDN customers connected to other switching modules, e.g., 1000. Control over such connections is implemented by controlling the contents of translation tables 63 of the communication path circuits, e.g. 6003, and the path completion information in controller 6124.

Control unit 6017 controls all communication on communication paths 6114 through 6116 and time multiplexer lines 1201 and 1202. To maintain such control, information regarding the capacity of each connection facility and the use of each VCI and time slot within the system of FIG. 2 is stored in control unit 6017 and updated whenever a communication change occurs. This information is used as discussed below to complete connections involving B-ISDN customers.

The following is an example of the establishment of an inter-B-ISDN connection from an originating customer connected to communication path circuit 6004 to a destination customer connected to communication path circuit 6003. The originating customer generates a control packet identifying the originating customer, the destination customer and the bandwidth to be allotted to the connection. This packet is transmitted to broadband switch unit 6001 including a B-ISDN header identifying VCI 1, the preassigned B-ISDN control channel. In response to the packet including the VCI 1, communication path circuit 6004 of broadband switch unit 6001 affixes to the packet a physical routing header identifying communication path circuit 6005 and changes the incoming VCI 1 to new VCI 17 (see FIG. 7, line 1) which identifies a control packet from communication path circuit 6004. The modified packet is then sent to communication path circuit 6005 via the broadband packet switch 6002. Communication path circuit 6005 receives the packet from broadband packet switch 6002 and transmits it over path 6114 to interface unit 6100. In response to the VCI 17 and the path completion information stored in controller 6124, the packet interface unit 6100 places the bytes of the customer information portion of the packet in predetermined time slots of a predetermined time-multiplex line 1202 to packet switch unit 6400.

Packet switch unit 6400 receives the packet in the predetermined time slot of the predetermined time-multiplex line which is reserved for control packets and connects the packet to control unit 6017 via processor interface 6300. The connection of control packets to the associated control unit is described in detail in the previously mentioned Beckner et al., patent. Control unit 6017 interprets the incoming packet as a request for connection between the communication paths 6115 and 6116 connected to communication path circuits 6004 and 6003, respectively and consults a table (not shown) to ascertain whether sufficient bandwidth exists through both of these communication path circuits to serve the requested communication. When insufficient bandwidth exists at either of the communication path circuits, control unit 6017 returns a control message to the originating customer via packet switch unit 6400, the interface 6100 and broadband switch unit 6001 denying the connection. Alternatively, when sufficient bandwidth is present, control unit 6017 transmits a set up message over connector 6027 to controller 6006 of broadband switch unit 6001. The set up message specifies the VCIs which are to be used for the connection on each of the communication paths 6115 and 6116.

In the present example, VCI 64 is specified for use on communication path 6115 at communication path circuit 6004 and VCI 18 is specified for use by communication path 6116 at communication path circuit 6003 as represented in FIGS. 6 and 7 at line 2. In response to the set up message, controller 6006 stores in the translation table 63 of trunk controller 6004 (FIG. 7) data specifying the physical routing header (6003) to be affixed to each packet received in the VCI 64 on communication path 6115 to direct packets to trunk controller 6003 and data defining the VCI 18 which is to replace the incoming VCI 64. Similarly, controller 6006 stores in the translation table 63 of trunk controller 6003 (FIG. 6) the physical routing header and VCI 64 which are to be used for packets received at communication path circuit in VCI 18. In addition to the set up of communication path circuit translation tables 63 of communication path circuits 6003 and 6004, a control message is sent to both the origination and termination customers via a B-ISDN control path through the interface unit 6100 and broadband switch unit 6001 identifying that a connection is established and the VCIs to use for that connection. Since the entire connection involves only a broadband switch 6001, no other unit within broadband switching module 6000 needs to be controlled to provide the connection.

Calls are also set up between narrowband subscribers connected, for example, to narrowband switch module 1000 (FIG. 1) and broadband ISDN subscribers connected to broadband switch module 6000. Such a call requires a connection from the originating communication path, e.g., 6115 to the interface 6100, connection through interface 6100 to time slot interchange unit 6011 via a time slot on a predetermined time-multiplex line 1201 and a connection to narrowband switch unit 1000 via the time-multiplex switch 10. A request for such a connection is received from the originating B-ISDN customer in the control channel VCI 1 of that customer and is forwarded as described above to control unit 6017. The latter unit determines the availability of bandwidth on communication paths 6115 and 6114 for call completion. It ascertains, by communication with central control 30 and narrowband switch unit 1000, the availability of the destination and the identity of a path through time-multiplex switch 10 to that destination. The establishment of paths between switching modules via time slot interchange units, e.g. 6011, and a time-multiplexed switch 10 is described in detail in the above discussed Beckner et al., patent.

When the necessary communication paths are available, control 6017 sends set up messages to controller 6006 of broadband switch unit 6001 and to controller 6124 of interface unit 6100 to specify the VCIs and time slots to be used to provide necessary connections. In the present example, it is assumed that VCI 80 on communication path 6115 and VCI 65 on communication path 6114 are selected by control unit 6017 to complete the connection. Controller 6006 responds to the set up message from control unit 6017 by storing information in the translation tables represented in line 3 of FIGS. 7 and 8. The set up message from control unit 6017 to controller 6124 specifies a selected time slot on a selected time-multiplexed line 1201 for use in making the requested connection. Controller 6124 responds to the set up message from control unit 6017 by storing in the controller 6124 path completion information for controlling the transmission of information received in VCI 65 of communication path 6114 to the selected time slot to time slot interchange unit 6011 and for connecting information received in the selected time slot from time slot interchange unit 6011 to VCI 65 on communication path 6114.

In the preceding examples, connections were established in response to call set up packets from broadband customers. Connections between broadband and narrowband customers are also established in response to request messages from narrowband customers. The following is an example of a call set up between a narrowband customer connected to path 1004 (FIG. 1) and a broadband customer connected to communication path 6116. The call set up message identifying the narrowband and broadband customers is received from path 1004 by narrowband switching module 1000 and forwarded to central control 30 via previously established control paths through the time-multiplex switch 10 and control distribution unit 31 which are known in the art and described in detail in the aforementioned Beckner et al. patent. Central control 30 transmits the set up message to the broadband switching module 6000 via pre-established control paths through the control distribution unit 31 and the time-multiplex switch 10 to the time slot interchange unit 6011 (FIG. 2). The time slot interchange unit 6011 connects the set up message to control unit 6017.

Control unit 6017 responds to the set up message in the same manner that it responds to a call set up packet from a broadband customer requesting a broadband-to-narrowband connection, that is, the control unit selects VCIs and physical routing headers for the broadband connection to and from communication path 6116 and interface 6100. Further, control unit 6017 controls interface 6100 to complete the necessary connections through interface 6100 to bi-directionally connect the information making up the requested communication between time slot interchange unit 6011 and communication path 6114. The remainder of the path from time slot interchange unit 6011 to path 1044 of narrowband switching module 1000 is described in detail in the aforementioned Beckner et al. patent.

VIDEO SWITCHING ARRANGEMENT

Figure 10:
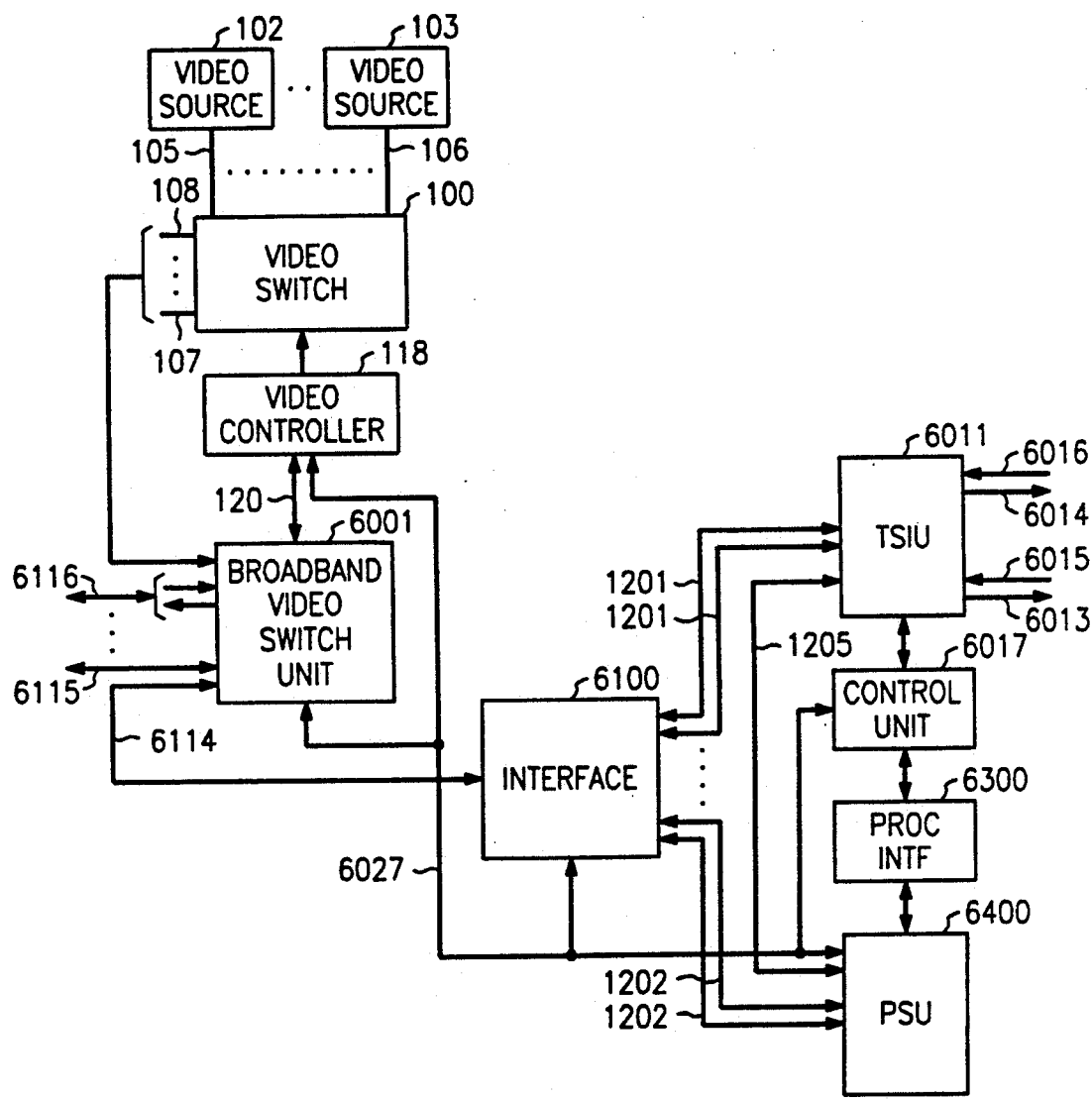
FIG. 10 is a block diagram of a broadband switching module equipped to provide video services.

Broadband switch module 6000 provides 150 megabit per second capacity to broadband customers attached by communication paths 6115 and 6116. This large capacity makes possible the connection to customers of packetized video signals which require approximately 45 megabits per second. A broadband switch module 6000 can be used to provide video signals to the customers. FIG. 10 shows an embodiment of the broadband switch module shown in FIG. 2 which is equipped to provide video services. The following describes the embodiment of FIG. 10. It should be noted that units having the same numerical designation in FIG. 10 as in FIG. 2 operate in substantially the same manner previously described and are not discussed in detail herein below.

The embodiment of FIG. 10 includes a video switch 100 which operates under the control of a video controller 118 and a plurality of video sources 102 and 103. Each of the video sources generates and transmits, via an associated path 105 and 106 respectively, signals in the broadband ISDN format of FIG. 3. Video switch 100 is of the type shown and described in G. W. Richards, U.S. Pat. No. 4,566,007 and provides circuit switched connections from any of the video source inputs, e.g., 105, to one or more of a plurality of outputs, e.g., 107 and 108. Outputs 107 and 108 are connected to broadband switch unit 6001 which distributes the packetized video signals to customer communication paths 6115 and 6116.

Packetized video signals, unlike bursty computer data, continuously use a relatively high bandwidth. That is, when a customer wants to watch a television program from one of the video sources 102 or 103 the video signals which are connected to a communication path, e.g., 6115 require a bandwidth of 45 megabits per second for the entire length of the program. If the signals for the program were connected to the communication path 6115 by the broadband packet switch 6002 large amounts of switch bandwidth would be used, reducing the switch bandwidth available to provide other connections. When a number of customers are all receiving a video signal, the available switch bandwidth is further reduced.

Figure 11:
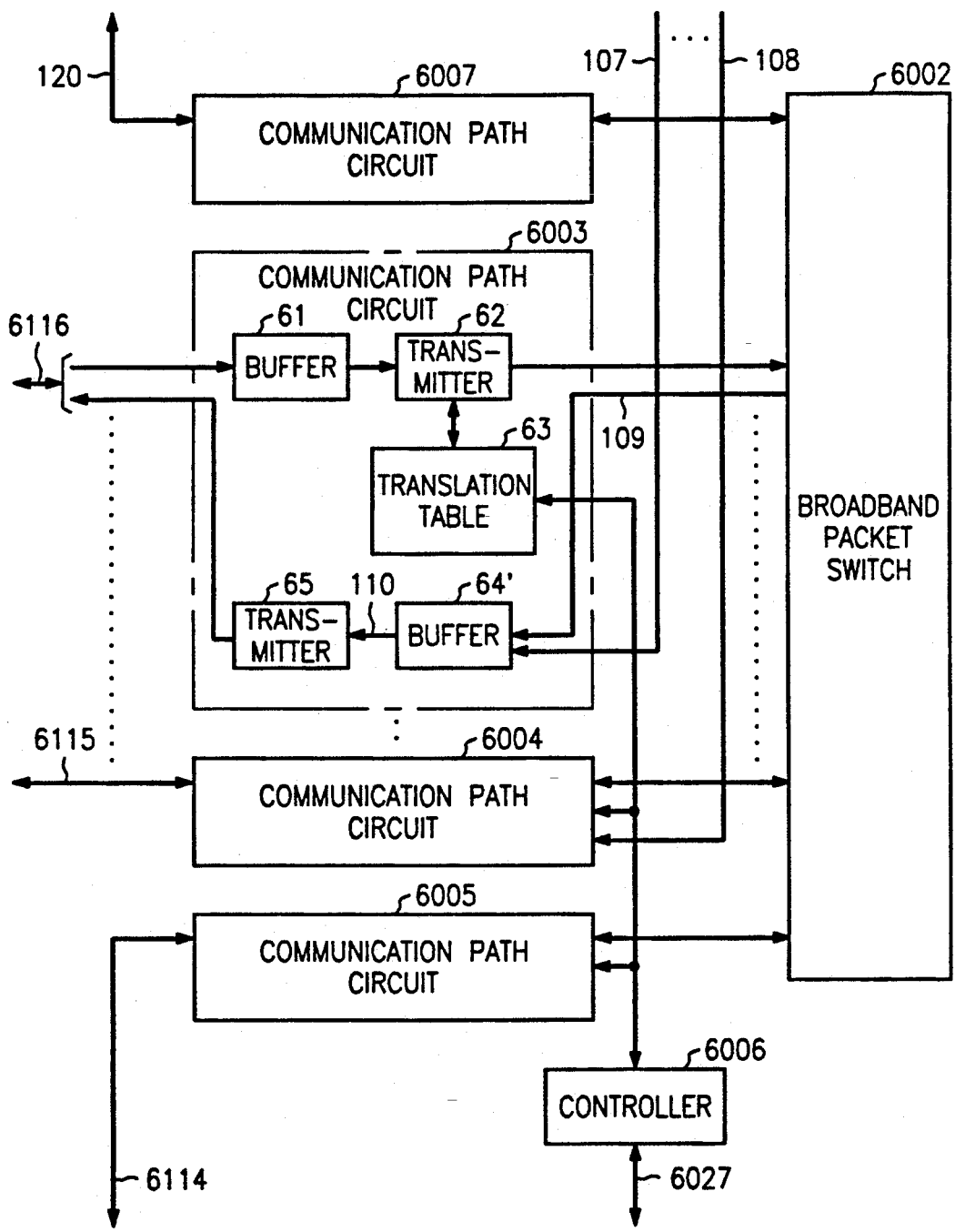
FIG. 11 is a block diagram of broadband switch unit of the embodiment shown in FIG. 10.
Figure 12:
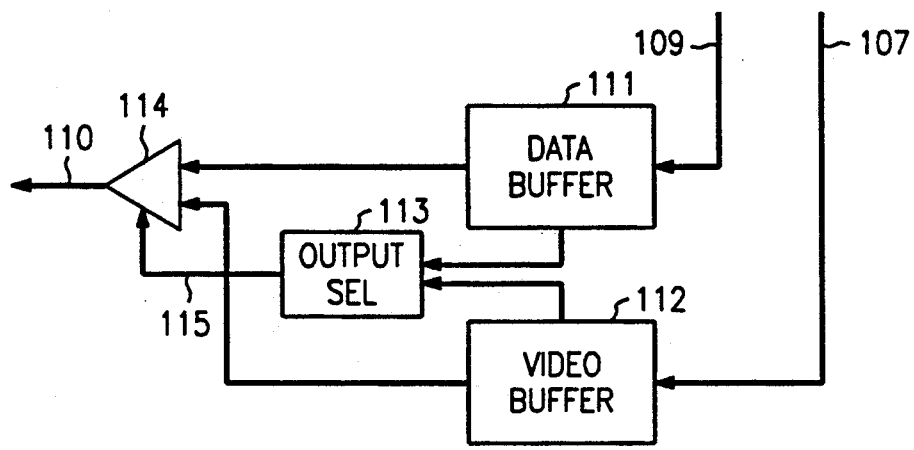
FIG. 12 shows a data buffer 64' of the communication path circuits of FIG. 11.

In the present embodiment, the video signal packets on outputs 107 and 108 are not connected to communication paths 6115 and 6116 by broadband packet switch 6002 but are combined with other packets destined for the communication paths in the communication path circuit, e.g., 6003 as shown in FIG. 11. Each of the video outputs 107 and 108 of video switch 100 is uniquely associated with one of the communication path circuits 6003 and 6004, respectively, and is connected to a buffer 64' of the associated communication path circuit. Buffer 64' functions in a manner similar to buffer 64 of FIG. 4 except that that buffer 64' merges the video packets from video switch 100 with the packets from broadband packet switch 6002 before they are sent by the transmitter 65 to a customer. FIG. 12 shows buffer 64' of communication path 6003 in greater detail and represents the buffer 64' used in all of the communication path circuits of the present embodiment.

Buffer 64' comprises a data buffer 111, which is connected by path 109 to receive packets from broadband packet switch 6002, and a video buffer 112, which is connected by path 107 to receive video packets from video switch 100. The outputs of video buffer 112 and data buffer 111 are connected to a gate circuit 114 which selectively connects packets to output 110 for connection to transmitter 65. Gate circuit 114 operates under the control of output selector 113 which receives inputs from both the data buffer 111 and buffer 112.

The input signals to the output selector 113 from buffers 111 and 112 indicate when a packet is present in the respective buffers for transmission. Whenever a video packet is available in video buffer 112 output selector 113 controls gate circuit 114 to gate the video packet to transmitter 65, regardless of the contents of data buffer 111. Alternatively, when no video packet is available, output selector 113 controls gate circuit 114 to connect packets from data buffer 111 to transmitter 65. Giving priority to the video packets is desirable since the video signal they represent is continuous in nature and substantial delay in the delivery of video packets can adversely affect the quality of video image presented to the customer.

The following describes the connection of signals from video source 102 to a customer attached to communication path 6116. A video connection to a customer is established in response to a video request control packet from that customer. The video request packet, which identifies the requesting customer and the particular video source 102 desired, is connected to control unit 6017 via the broadband switch unit 6001 and the interface 6100 in same manner that the previously discussed call set up packets are connected to 6017. Control unit 6017 responds to video requests by analyzing the available bandwidth to determine if the request can be satisfied. When insufficient bandwidth exist on communication path 6116 to the requesting customer, control unit 6017 denies the request and notifies the requesting customer of such denial via a packet message. Alternatively, when bandwidth is available, the control unit 6017 returns a packet indicating such to the requesting customer and transmits a connection control message to video switch controller 118 via path 6027. Video switch controller 118 responds to the connection control message by controlling video switch 100 to connect video packets from video source 102 to path 107 which is associated, by connection to communication path circuit 6003, with communication path 6116. Packets from video switch 100 are received by the buffer 64' of communication path 6003 and are transmitted to the requesting customer as described above.

A connection is terminated by a video disconnect packet from the customer. The video disconnect packet is connected from communication path 6116 to control unit 6017 which deallocates the previously allocated bandwidth on communication path 6116 and notifies video switch controller 118 to disconnect the path through video switch 100.

The allocation of bandwidth for video connections and all other connections to communication paths 6115 and 6116 is performed by the control unit 6017 on the basis of capacity tables stored thereby. Centralizing the allocation of bandwidths is done to improve the efficiency of the system as a whole. Once video bandwidth has been allocated on a communication path, e.g., 6116 the control unit 6017 need not be consulted unless a change in allocation is needed. Changing video sources (changing channels) in the present embodiment does not require changes in bandwidth allocation and therefore does not require the intervention of control unit 6017.

A broadband switch unit 6001 (FIG. 11) of a broadband switch module 6000 equipped to provide video service includes a communication path circuit 6007 which is connected to an input/output port of broadband packet switch 6002. A communication path 120 of communication path circuit 6007 is connected to video switch controller 118. Communication path circuit 6007 is used to forward channel change requests to video switch controller 118 after a video connection has been established by controller 6017. That is, once video connection permission has been granted by control unit 6017 to a communication path, e.g., 6116 the particular video source which is used to occupy that connection is controlled by video switch controller 118 in response to requests from customers.

After permission to use video bandwidth has been granted by control unit 6017 and a video source, e.g., 102 has been connected to a communication path e.g. 6116, as described above, the particular video source can be changed without consulting control unit 6017. A video source change is initiated when a customer connected to a communication path circuit, e.g., 6116 transmits a video source identity packet to its associated communication path circuit, e.g., 6003. The video source identity packet includes a predetermined video source identity VCI which in the present example is VCI 200. Transmitter 62 (FIG. 11) upon accessing translation table 63 changes the packet VCI to 203 and affixes a physical routing header identifying communication path circuit 6007 as shown in line 3 of FIG. 6. The VCI of 203 is unique to communication path circuit 6003 so that the video switch controller 118 can identify the source of the change request. Broadband packet switch 6002 responds to the physical routing header from table 63 and gates the packet with VCI 203 to communication circuit 6007 which forwards the video source identity packet to video switch controller 118 via communication path 120. Video switch controller 118 responds to the packet requesting a change from one video source, e.g., 102 to another video source, e.g., 103 by selectively connecting a new video source, e.g., 103 to path 107. No changes are required in the operation of buffer 64' which continues to connect video packets to communication path circuit 6116 regardless of the source of those packets.

I claim:
1. A packet switching arrangement comprising;
a packet switching network comprising a plurality of incoming lines for receiving customer packets from customers, a plurality of outgoing lines for conveying packetized information to said customers and means responsive to customer packets received on said incoming lines for selectively connecting said received customer packets to said outgoing lines;
a plurality of sources of video signal packets;
video switch means for selectively connecting ones of said video signal packets to said outgoing lines without being transmitted through said packet switching network; and
control means common to said packet switching network and said video switch means and responsive to control signals received from said incoming lines for controlling the connections provided by said packet switching network and said video switch means.

2. The arrangement of claim 1 wherein said packet switching network comprises means responsive to control packets received on said incoming lines for connecting said control packets to said control means; and
said control means comprises means responsive to said control packets for controlling the connections provided by said packet switching network and said video switch means.

3. The arrangement of claim 1 wherein each of said outgoing lines comprises a selector means for receiving customer packets from said packet switching network and video signal packets from said video switch means and for selectively merging said customer packets and said video signal packets onto one of said outgoing lines.

4. The arrangement of claim 3 wherein said selector means interleaves said customer packets from said packet switching network and said video signal packets from said video switch means into a stream of packets on one of said outgoing lines.

5. The arrangement of claim 3 wherein said selector means of a first outgoing line comprises means for selectively connecting a video signal packet from said video switch means onto said first outgoing line whenever a video signal packet is present at said selector.

6. A packet switching arrangement comprising:
a packet switching network comprising a first communication path comprising a first input line and a first output line, a second communication path comprising a second input line and a second output line and means responsive to packets received on said first input line for selectively connecting said received packets to said second output line;
a plurality of sources of video signal packets;
video switch means for selectively connecting ones of said video signal packets to said second output line contemporaneously with the connection by said packet switching network of packets from said first input line to said second output line; and
means responsive to control packets received at said input lines for connecting said control packets to a control means;
said control means is common to said packet switching network and said video switch means and is responsive to said control packets for controlling the selective connection of said customer packets from said first input line to said second output line by said packet switching network and for controlling the selective connection of said video signal packets to said second output line by said video switch means.

7. The arrangement of claim 6 wherein said control packets comprise customer control packets received at said first input line and video control packets received at said second input line; and
said control means is responsive to said customer control packets for controlling the selective connection of said customer packets from said first input line to said second output line and responsive to said video control packets for controlling the selective connection of said video signal packets to said second output line by said video switch means.

8. The arrangement of claim 6 wherein said second outgoing line comprises a selector means for receiving customer packets from said packet switching network and video signal packets from said video switch means and for selectively merging said customer packets from said packet switching network and said video signal packets from said video switch means onto said second outgoing line.

9. A video packet switching arrangement comprising:
video switch means connected to a plurality of customer access lines for selectively connecting video signal packets from a plurality of video sources to said customer access lines;
control means, responsive to a video service request packet received on one of said customer access lines, for sending connection permission signals to said video switch means;
means for connecting a video source identity packet received on said one customer access line to said video switch means, said video source identity packet identifying one of said video sources; and
said video switch means comprises means responsive to said permission signals and said video source identity packet for connecting video signal packets from said identified video source to said one customer access line.

10. The arrangement of claim 9 comprising a packet switch means for selectively connecting packets received on said customer access lines to other ones of said customer access lines and to said control means.

11. The arrangement of claim 9 said control means comprises means for recording the available bandwidth on said one customer access line and for sending said permission signals when the bandwidth available on said one access line exceeds the bandwidth required to convey video signal packets from one of said video sources.

12. A video packet switching arrangement comprising:
video switch means connected to a plurality of customer access lines for selectively connecting video signal packets from a plurality of video sources to said customer access lines;
control means, responsive to a video service request packet received on one of said customer access lines and identifying a first one of said video sources, for sending connection permission signals identifying said first video source to said video switch means;
said video switch means comprises means responsive to said connection permission signals for connecting said first video source to said one customer access line;
means for connecting a video source change packet received on said one customer access line to said video switch means, said video source change packet identifying a second one of said video sources; and
said video switch means comprises means responsive to said connection permission signals and said video source change packet for disconnecting said first video source from said one customer access line and for connecting video signal packets from said second video source to said one customer access line.

13. The arrangement of claim 12 wherein said first means for connecting comprises a packet switch means for selectively connecting packets received on said customer access lines to other ones of said customer access lines and to said first control means.

14. The arrangement of claim 13 wherein said first control means comprises means for recording the available bandwidth on said one customer access line and for sending said connection permission signals when the bandwidth available on said one access line exceeds the bandwidth required to convey video signal packets from said first video source.

15. A packet switching arrangement for providing packet switched interconnection among a plurality of customer access lines and for providing packet switched video services to said customer access lines, comprising:
broadband packet switch means connected to said customer access lines for selectively connecting customer packets between said customer access lines;
a video switch means for selectively connecting video signal packets from a plurality of video sources to said customer access lines;
means in said broadband packet switch means for connecting a video service request packet received on one of said customer access lines to a bandwidth allocation controller;
said bandwidth allocation controller comprising means responsive to said video service request packet for granting permission to said video switch means for the connection of video signal packets to said one customer access line;
means, in said broadband switch means, responsive to a video source request packet received on said customer access line and identifying one of said video sources for connecting said video source request packet to said video switch means; and
said video switch means comprises means responsive to said video source request packet and to the grant of permission by said bandwidth allocation controller for connecting packets from said identified video source to said one customer access line.

16. A broadband switching module comprising:
a broadband switch unit comprising interface means connected to a plurality of incoming and outgoing lines and broadband packet switch means for selectively connecting broadband packets received on said incoming lines to said outgoing lines;
video switch means operable for connecting to any one of said outgoing lines any one of a plurality of video signals receivable from a plurality of video sources;
video switch control means responsive to a receipt of permission signals for operating said video switch means to establish video switch connections from one of said plurality of video sources to one of said outgoing lines and further responsive to channel change signals received on one of said incoming lines for connecting another of said video sources to said one outgoing line; and a bandwidth allocation control unit responsive to control signals received on said incoming lines for generating said permission signals.

17. The module of claim 16 wherein said interface means comprises selector means for selecting packets from said broadband packet switch means and from said video switch means for transmission on each of said outgoing lines.

* * * * *